(12) United States Patent
Treadwell

(10) Patent No.: US 10,318,730 B2
(45) Date of Patent: Jun. 11, 2019

(54) DETECTION AND PREVENTION OF MALICIOUS CODE EXECUTION USING RISK SCORING

(75) Inventor: William S. Treadwell, Warrenton, VA (US)

(73) Assignee: Bank of America Corporation, Charlotte, NC (US)

( * ) Notice: Subject to any disclaimer, the term of this patent is extended or adjusted under 35 U.S.C. 154(b) by 2870 days.

(21) Appl. No.: 11/961,390

(22) Filed: Dec. 20, 2007

(65) Prior Publication Data

US 2009/0165131 A1 Jun. 25, 2009

(51) Int. Cl.
*G06F 21/52* (2013.01)
*G06F 21/56* (2013.01)

(52) U.S. Cl.
CPC ............ *G06F 21/566* (2013.01); *G06F 21/52* (2013.01)

(58) Field of Classification Search
CPC ... H04L 63/1416; G06F 21/56; G06F 21/562; G06F 21/563; G06F 21/564; G06F 21/566
USPC ........ 713/164, 201; 726/22, 24, 26; 717/124
See application file for complete search history.

(56) References Cited

U.S. PATENT DOCUMENTS

| | | | | |
|---|---|---|---|---|
| 7,814,544 B1* | 10/2010 | Wilhelm | ........................ | 726/22 |
| 2003/0212913 A1* | 11/2003 | Vella | ............................ | 713/202 |
| 2004/0230835 A1* | 11/2004 | Goldfeder et al. | ........... | 713/201 |
| 2005/0108562 A1* | 5/2005 | Khazan et al. | ............... | 713/200 |
| 2006/0053492 A1* | 3/2006 | Wallace | .......................... | 726/26 |
| 2006/0075494 A1* | 4/2006 | Bertman et al. | ................ | 726/22 |
| 2007/0016953 A1* | 1/2007 | Morris et al. | .................... | 726/24 |
| 2007/0079379 A1* | 4/2007 | Sprosts et al. | ................... | 726/24 |
| 2007/0168982 A1* | 7/2007 | Horne | .......................... | 717/124 |
| 2007/0240212 A1* | 10/2007 | Matalytski | ...................... | 726/22 |
| 2008/0016339 A1* | 1/2008 | Shukla | ......................... | 713/164 |
| 2008/0133540 A1* | 6/2008 | Hubbard et al. | ............... | 707/10 |
| 2008/0134145 A1* | 6/2008 | Halcrow et al. | ............. | 717/124 |
| 2009/0094175 A1* | 4/2009 | Provos et al. | .................. | 706/12 |
| 2009/0282476 A1* | 11/2009 | Nachenberg et al. | .......... | 726/22 |

FOREIGN PATENT DOCUMENTS

WO WO 2006/101549 A2 9/2006

OTHER PUBLICATIONS

Mori, Akira et al., "A Tool for Analyzing and Detecting Malicious Mobile Code", Pub. Date: May 2006, pp. 831-834.*
Kendall, Kris et al. "Practical Malware Analysis." Black Hat DC 2007.
International Search Report and the Written Opinion of the International Searching Authority dated Aug. 10, 2009 for International Application No. PCT/US2008/088028.
International Preliminary Report on Patentability dated Jul. 1, 2010 for International Application No. PCT/US2008/088028.

* cited by examiner

*Primary Examiner* — Azizul Choudhury
(74) *Attorney, Agent, or Firm* — Michael A. Springs; Moore & Van Allen PLLC; Jeffrey R. Gray

(57) ABSTRACT

A system and method for preventing malicious code execution, includes detecting a request for execution of a file. The file is scanned for risk before processing the request. A score is assigned to the risk. Execution of the file is either allowed or prohibited responsive to the risk score.

19 Claims, 3 Drawing Sheets

DETECTION AND PREVENTION OF MALICIOUS CODE EXECUTION USING RISK SCORING

BACKGROUND OF THE INVENTION

The present invention is related to detection and prevention of malicious code execution, and more specifically to detection and prevention of malicious code execution using risk scoring.

Malicious software is a constant battle that security practitioners must deal with, especially in large enterprises. Currently, most corporations rely on several control mechanisms (such as spam filters, virus scanning on email, and Intrusion Detection/Prevention Systems) to look for signatures in flowing network traffic, and anti-virus software installed on host computers that look at each file and compare it against signatures stored in the anti-virus software's memory system. The drawback to each of these systems is the reliance on signatures, or known sequences or patterns, which can be used to identify bad software files.

Current methods to detect malicious software files typically include a combination of heuristic scanning and signature definitions based on reverse engineering each malware sample. Thus, the anti-virus solution is always behind the release of new variants of malware. This is because anti-virus (AV) solutions typically require a virus sample in order to help identify new definitions to detect the virus. This methodology ensures that malicious software will, for a period of time, be able to spread and infect machines with little to no detection or remediation until the virus is discovered, a sample obtained, and new definitions to detect and prevent the virus identified.

Heuristic scanning techniques rely on observable behavior of the execution of malicious software to accurately detect and identify software as malicious. The problem with this technique is that it relies on consistent execution techniques. Malware writers have introduced poly/meta-morphism and custom packing and encrypting into their malicious software, thus changing the observable execution characteristics making heuristic scanning much less reliable.

Another technique makes use of observable characteristics of the files themselves and not on the execution pattern. Furthermore, the observable characteristics make use of, and rely on, the obfuscation techniques themselves as this behavior is not present in most normal software. The malware obfuscation techniques are then turned against the malware writers. One version of this technique relies heavily on the entropy of the code sections themselves to detect the obfuscation and probable packing of malicious software. However, it has been determined that this is not completely reliable and prone to error in sophisticated malware trials.

BRIEF SUMMARY OF THE INVENTION

According to one aspect of the present invention, a method for prevention of malicious code execution that includes detecting a request for execution of a file, scanning the file for risk before processing the request, assigning a score to the risk, and performing one of allowing or prohibiting execution of the file responsive to the risk score.

According to another aspect of the present invention, an apparatus comprising a storage medium with instructions stored therein, the instructions when executed causing a processing device to perform detecting a request for execution of a file, scanning the file for risk before processing the request, assigning a score to the risk, and performing one of allowing or prohibiting execution of the file responsive to the risk score.

According to a further aspect of the present invention, a device includes a processor and a memory. The memory contains malicious code software, the malicious code software when executed preventing malicious code execution by performing detection a request for execution of a file, scanning the file for risk before processing the request, assigning a score to the risk, and one of allowing or prohibiting execution of the file responsive to the risk score.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
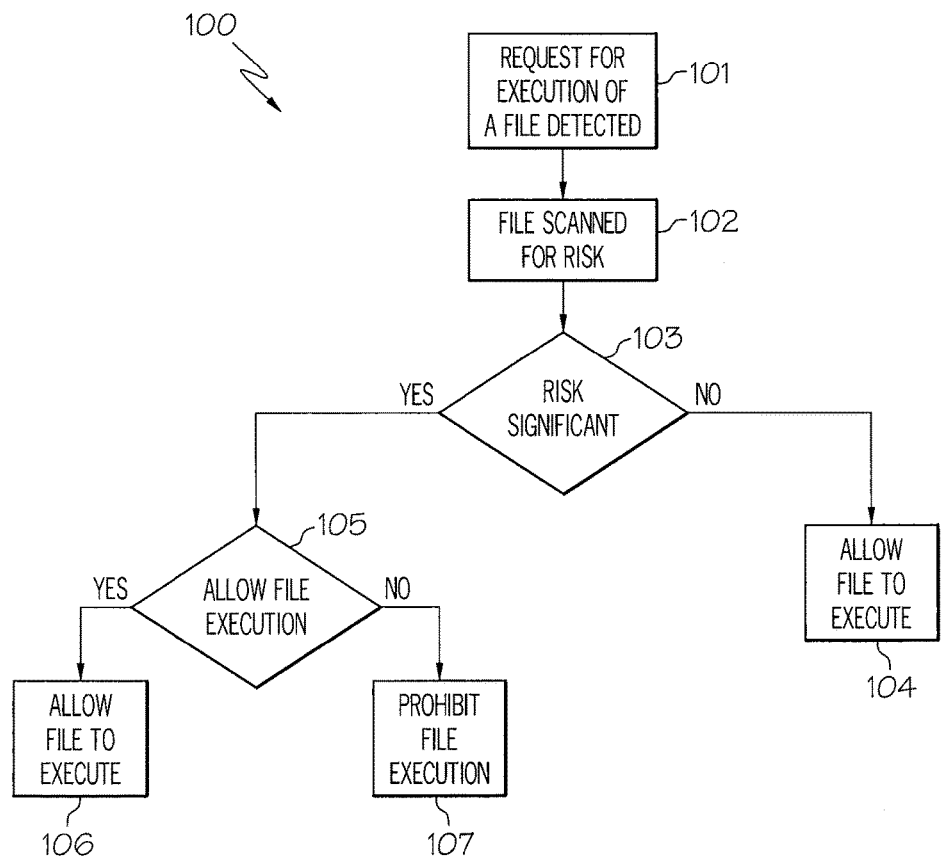
FIG. 1 is a flowchart of a process for prevention of malicious code execution according to an example embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, microcode, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments according to the present invention prevent the execution of possible malicious software from being executed intentionally or unintentionally without relying on signatures for detection. Thus, malicious software (e.g., malware file) may be proactively prevented from execution when no anti-virus definitions exist. Further, according to embodiments of the present invention, a risk scoring methodology (e.g., binary risk scoring) may be used to assign a risk score to detected malware. Based on the assigned risk score, the malware file may be allowed to execute, prohibited from execution, or a user prompted to determine whether to allow the execution of the malware file. Embodiments according to the present invention may intercept calls to create a process or to a software function application programming interface (API), (e.g., "CreateProcessW" software function, "ZwCreateProcessEx" software function, NtCreateSection software function, ZwCreateSection software function, etc.), to allow scanning of the suspected malware file requesting execution before the file is allowed to execute.

For example, according to embodiments of the present invention, the occurrence of a request for a file execution may be detected and, before execution of the file, scanning of the file may be performed to determine a risk score for the file. If the risk score is rated low, execution of the file may be allowed to continue uninhibited. If the risk score is rated medium, a user may be prompted indicating that the file is possibly malicious and asking the user if they wish to continue with allowing execution of the file. If the risk score is rated high, indicating that the file may be malicious, the file may be automatically prohibited from execution, and the user may be given an alert. Alternatively, for files with a high risk score, a user may be prompted and the file may be prohibited from execution in response to selection from the user.

Moreover, in embodiments according to the present invention, a virtual environment and/or a debugger may be emulated to detect and prevent malicious files since current malware trends indicate that malware will not execute in the presence of these environments. Thus, embodiments of the present invention may emulate a virtual environment and/or a debugger to detect and prevent execution of malware.

FIG. 1 shows a flowchart of a process for prevention of malicious code execution according to an example embodiment of the present invention. In the process 100, in block 101, a request for execution of a file may be detected. In block 102, the file may be scanned for risk. In block 103, it may be determined if the risk is significant and if not, in block 104, the file may be allowed to execute. If the risk is significant, then in block 105 it may be determined whether to allow execution of the file. If it is determined to allow execution of the file, in block 106 the file may be allowed to execute. However, if it is determined not to allow execution of the file, in block 107 execution of the file may be prohibited. The process 100 may exist in a kernel driver, a system service process running in the background that is not a part of the kernel, a dynamic link library (DLL) loaded into every application, or may be a stand alone binary loader that replaces or is incorporated into an operating system (e.g., Windows) loader.

Figure 2:
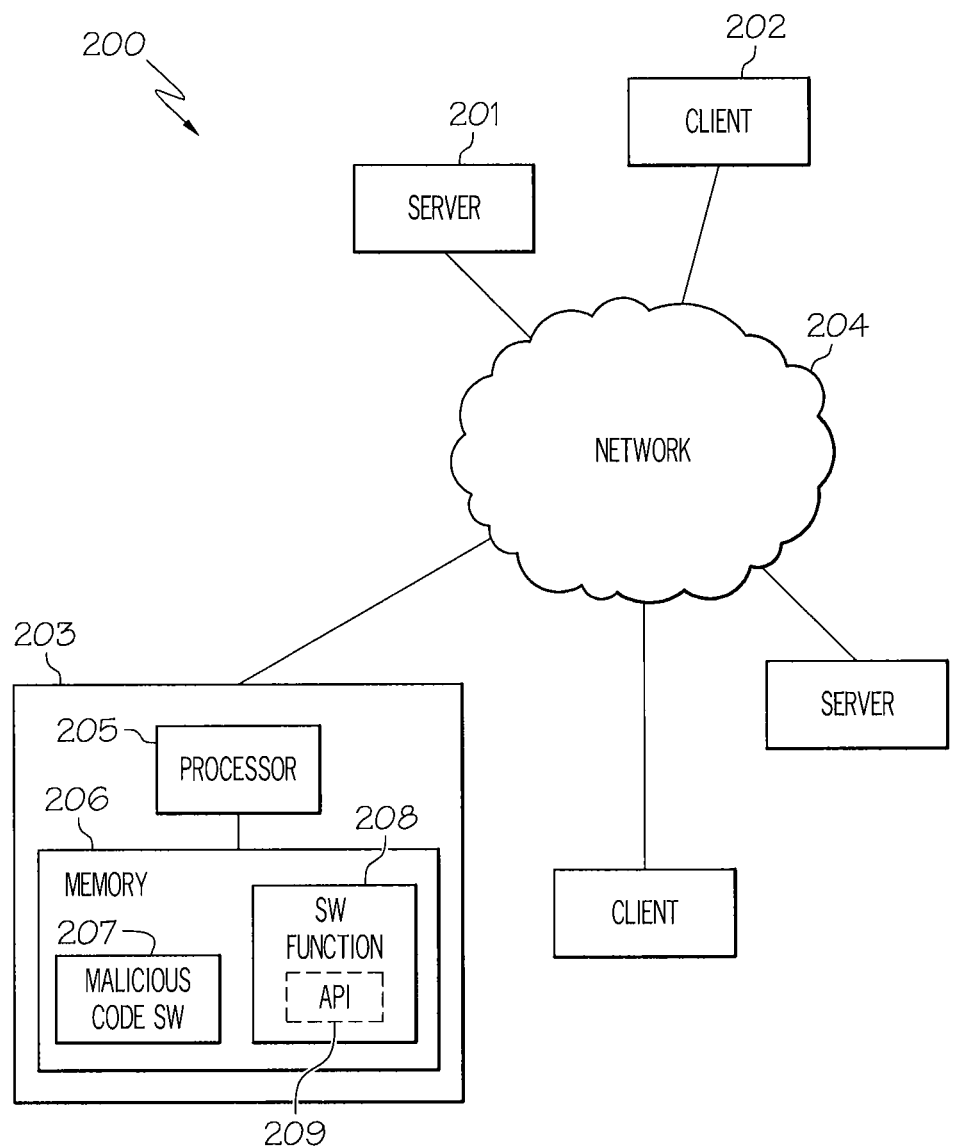
FIG. 2 is a system for preventing malicious code execution according to an example embodiment of the present invention.

FIG. 2 shows a system for preventing malicious code execution according to an example embodiment of the present invention. The system 200 may include one or more servers 201, one or more client devices 202, and/or one or more processing devices 203, which may be a server, client, or other type of processing device. The server devices 201, client devices 202 and other processing devices 203 may be connected to a network 204 (e.g., the Internet). The processing device 203 may include a processor 205 and a memory 206. The memory 206 may contain various applications, functions, software, instructions, etc. For example, the memory 206 may contain malicious code software 207 that performs prevention of malicious code execution by performing detection of a request for execution of a file, scanning of the file for risk before processing the request, assigning a score to the risk, and either allowing or prohibiting execution of the file responsive to the risk score. The memory 206 may also contain one or more software functions 208 that have an associated application program interface 209 for interfacing with other code. The software function 208 may be a function that supports an operating system such as, for example, a CreateProcessW function, a ZwCreateProcessEx function, etc.

Figure 3:
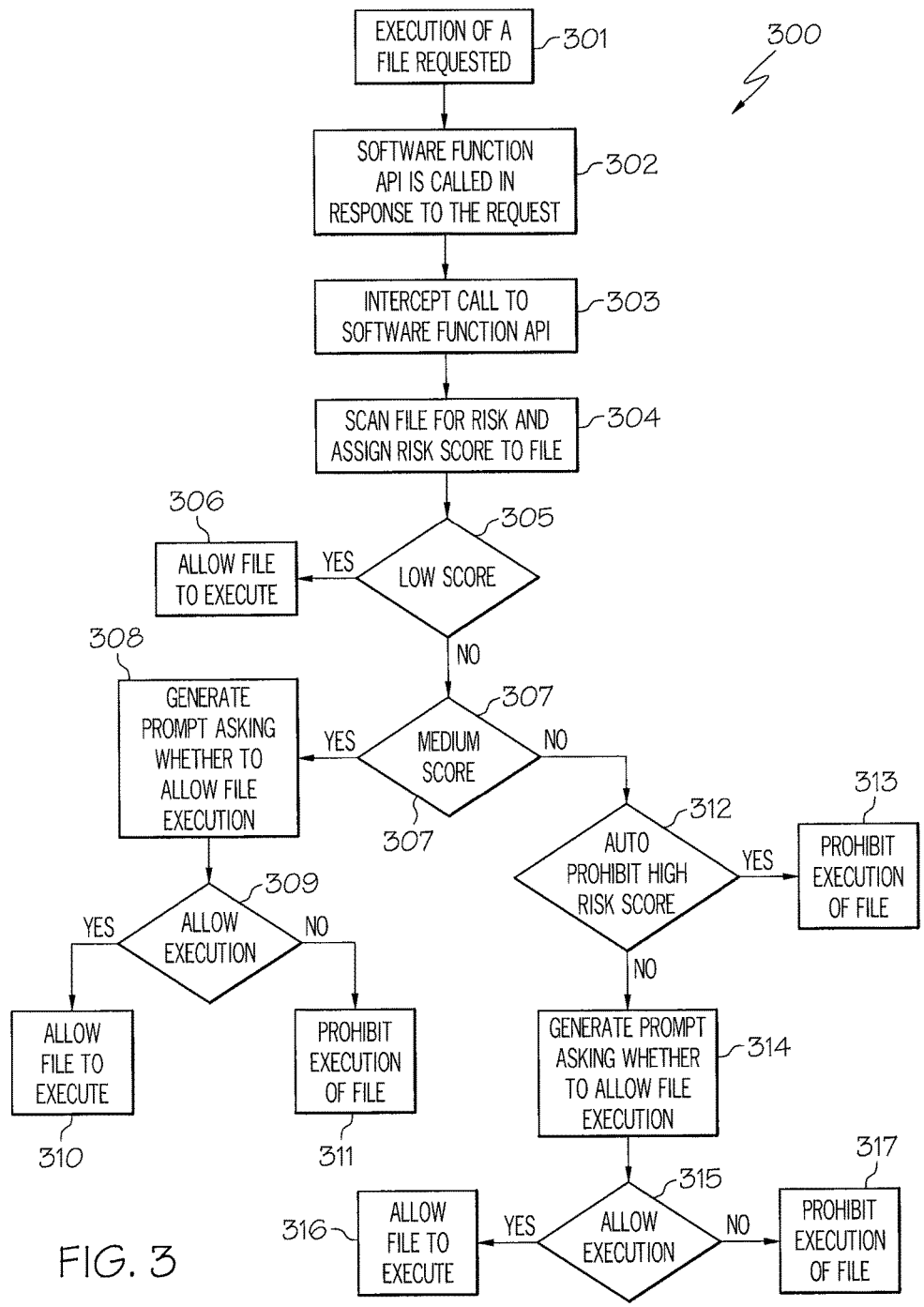
FIG. 3 is a flowchart of a process for preventing malicious code execution according to another example embodiment of the present invention.

FIG. 3 shows a flowchart of a process for preventing malicious code execution according to another example embodiment of the present invention. In the process 300, in block 301, execution of a file may be requested. In block 302 a software function application program interface (API) may be called in response to the request. In block 303, the call to the software function API may be intercepted. In block 304 the file may be scanned for a risk and a risk score assigned to the file based on the scanning. In block 305 it may be determined if the file has a low risk score and if so, in block 306 the file may be allowed to execute. If the file does not have a low score it may be determined in block 307 whether the file has a medium risk score and if so, then in block 308 a prompt may be generated asking whether to allow execution of the file. In block 309 it may be determined if execution of the file should be allowed and if so, in block 310 the file may be allowed to execute. If it is determined not to allow execution of the file, then in block 311 execution of the file may be prohibited. If it is determined in block 307 that the file does not have a medium risk score then in block 312 it may be determined if automatic prohibition of files with a high risk score is enabled, and if so, in block 313 the file may be prohibited from execution. If automatic prohibition of files with a high risk score is not enabled, then in block 314 a prompt may be generated asking whether to allow execution of the file. In block 315 it may be determined if execution of the file should be allowed and if so, in block 316 the file may be allowed to execute. If it is determined not to allow execution of the file, then in block 317 execution of the file may be prohibited.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for prevention of malicious code execution comprising:
   emulating, via a computing device processor, a virtual computing environment and a debugger tool;
   while the virtual computing environment and debugger are emulating, detecting, via the computing device processor, a request for execution of a file by intercepting a call to a software function application program interface (API);
   in response to intercepting the call, scanning, via the computing device processor, the file for risk before processing the request;
   determining, via the computing device processor, a risk score for the file as a result of the scanning of the file for risk, wherein the risk score is based on an interface identifier (IID) associated with the file, obfuscation techniques of the file, and entropy of the file; and
   performing, via the computing device processor, one of allowing or prohibiting execution of the file responsive to the risk score.

2. The method according to claim 1, further comprising providing, via the computing device processor, an alert responsive to the risk score.

3. The method according to claim 2, wherein providing further comprises providing the alert when the risk score is medium.

4. The method according to claim 1, further comprising allowing execution of the file when the risk score is low.

5. The method according to claim 1, further comprising prohibiting execution of the file when the risk score is high.

6. The method according to claim 1, wherein detecting further comprises detecting, via the computing device processor, the request for execution of the file by intercepting a call to a CreateProcessW or a ZwCreateProcessEx software function application program interface (API).

7. The method according to claim 1, wherein the risk score comprises one of a low risk, a medium risk, or a high risk.

8. The method according to claim 1, wherein the detecting the request, the scanning the file, the determining the score, and the performing the allowing or execution are performed by one of a kernel driver, a system service process not a part of a kernel, a dynamic link library (DLL) loaded into an application, or a standalone binary loader.

9. An apparatus comprising a non-transitory computer-readable medium with instructions stored therein, the instructions when executed causing a processing device to perform:
   emulating a virtual computing environment and a debugger tool;
   while the virtual computing environment and debugger are emulating, detecting a request for execution of a file by intercepting a call to a software function application program interface (API);
   in response to intercepting the call, scanning the file for risk before processing the request;
   determining a risk score for the file as a result of the scanning of the file for risk, wherein the risk score is based on an interface identifier (IID) associated with the file, obfuscation techniques of the file and entropy of the file; and performing one of allowing or prohibiting execution of the file responsive to the risk score.

10. The apparatus according to claim 9, further comprising providing an alert responsive to the risk score.

11. The apparatus according to claim 9, further comprising providing an alert when the risk score is medium.

12. The apparatus according to claim 9, further comprising allowing execution of the file when the risk score is low.

13. The apparatus according to claim 9, further comprising prohibiting execution of the file when the risk score is high.

14. The apparatus according to claim 9, wherein detecting further comprises detecting, via the computing device processor, the request for execution of the file by intercepting a call to a CreateProcessW or a ZwCreateProcessEx software function application program interface (API).

15. The apparatus according to claim 9, wherein the risk score comprises one of a low risk, a medium risk, or a high risk.

16. The apparatus according to claim 9, wherein the detecting the request, the scanning the file, the determining the score, and the performing the allowing or execution are performed by one of a kernel driver, a system service process not a part of a kernel, a dynamic link library (DLL) loaded into an application, or a standalone binary loader.

17. A device comprising:
a processor; and
a memory, the memory including malicious code software, the malicious code software is configured to prevent execution of malicious code by detecting a request for execution of a file by intercepting a call to a software function application program interface (API) while a virtual computing environment and a debugger are emulating, in response to intercepting the call scanning the file for risk before processing the request, determining a risk score for the file as a result of the scanning of the file for risk, wherein the risk score is based on an interface identifier (IID) associated with the file, obfuscation techniques of the file and entropy of the file, and one of allowing or prohibiting execution of the file responsive to the risk score.

18. The device of claim 17, wherein the malicious code software when executed prevents malicious code execution by further performing detecting the request for execution of the file by intercepting the call to a CreateProcessW or a ZwCreateProcessEx software function application program interface (API).

19. The device of claim 17, wherein the malicious code software is performed by one of a kernel driver, a system service process not a part of a kernel, a dynamic link library (DLL) loaded into an application, or a standalone binary loader.

* * * * *